Sept. 29, 1959     C. W. RITTER     2,906,539
GRANULAR MATERIAL APPLICATOR
Filed April 2, 1956     2 Sheets-Sheet 1
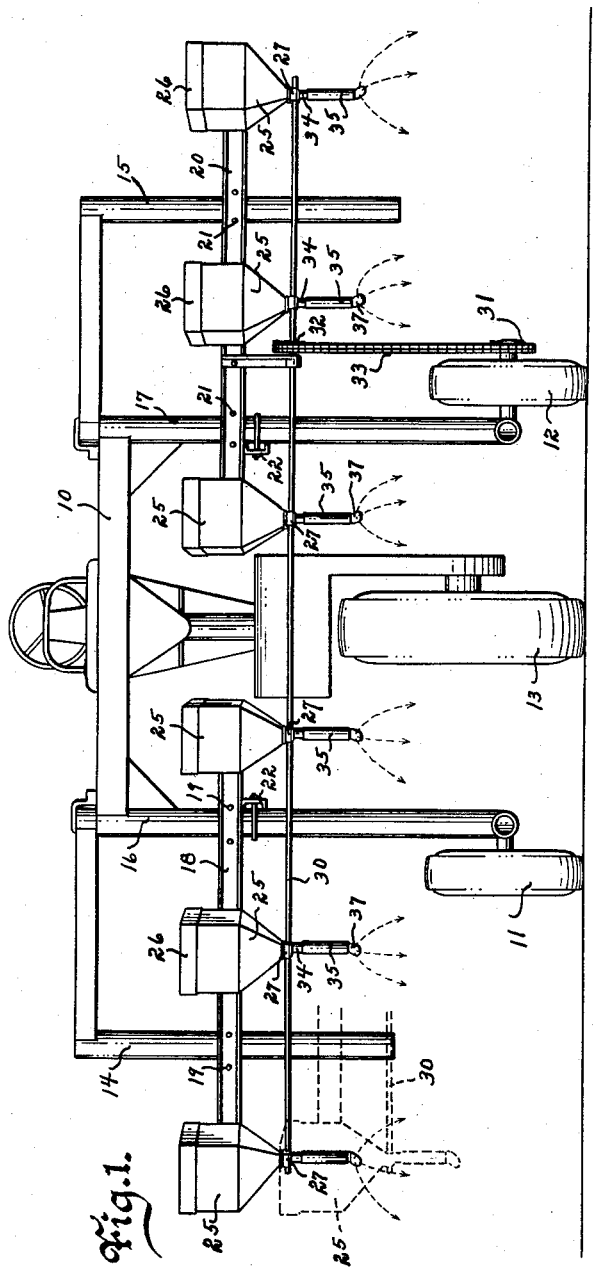
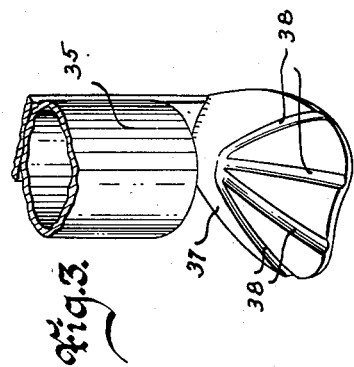
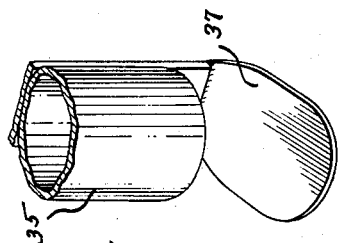
Inventor
Charles W. Ritter
by M. Talbert Dick
Attorney
Witness
Edward P. Seeley

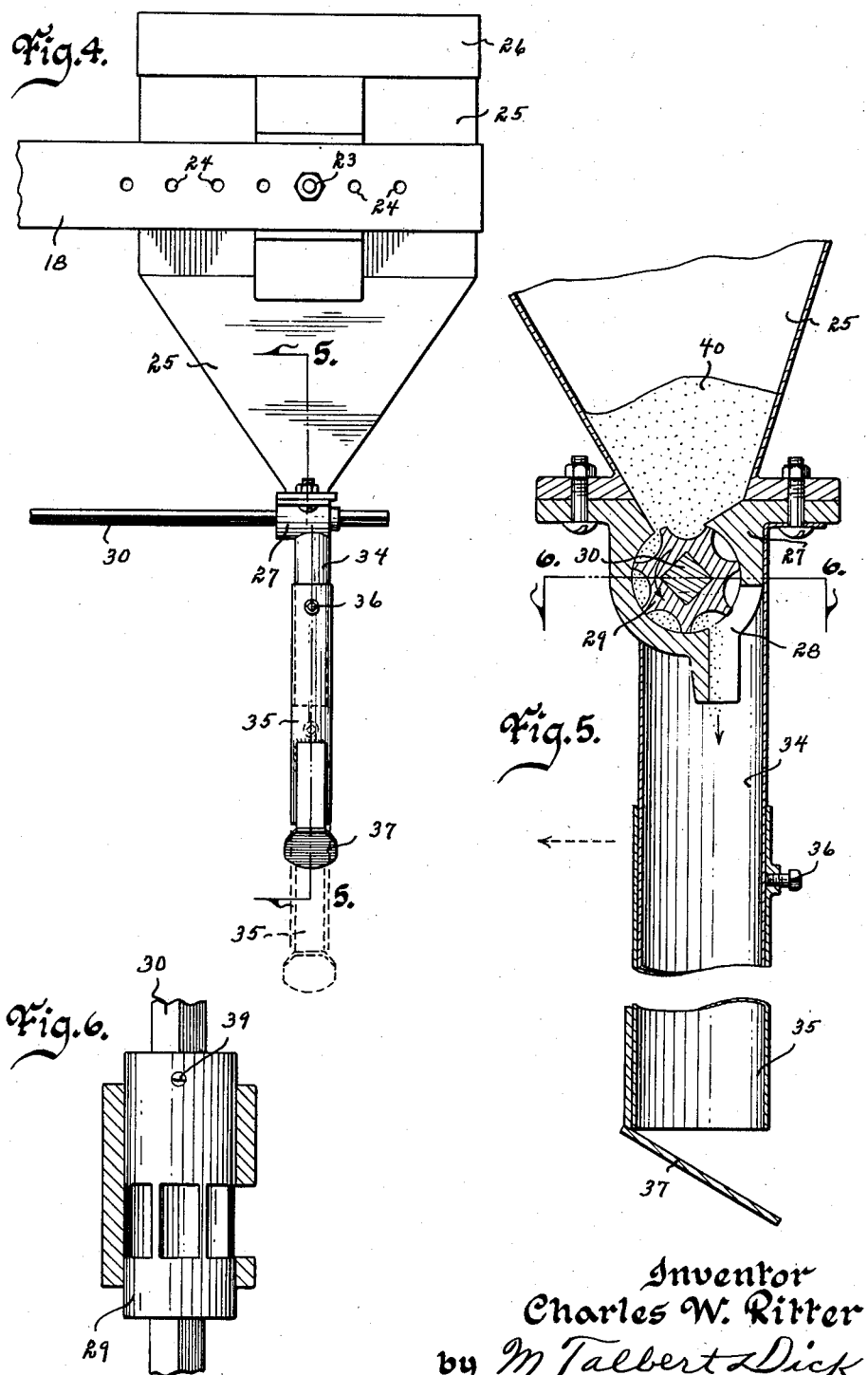

United States Patent Office 2,906,539
Patented Sept. 29, 1959

2,906,539

GRANULAR MATERIAL APPLICATOR

Charles W. Ritter, Sac City, Iowa

Application April 2, 1956, Serial No. 575,495

2 Claims. (Cl. 275—7)

This invention relates to farm implements and more particularly to one that will deposit granular material over a field.

While my device may well be used for distributing various types of insecticides, fertilizers, and like, over a given area, it is especially efficient in applying granular DDT on corn plants for the control of the European corn borer. Because the corn borer is the greatest single scourge ever faced by corn raisers in this country, various means have been tried to at least reduce the tremendous losses caused by the borer. One method is to grind up or destroy the corn stalks after harvesting so as to eliminate the housing of the grub in the stalk through the winter months. Another method is to liquid spray the young corn with an insecticide. While it is necessary to treat both the young corn and the old corn stalks, the liquid spraying of the green corn is far the most troublesome. First the spraying must be accomplished at specific times in the life cycle of the borer and this may mean several sprayings. Secondly, the weather must be ideal as liquid spraying is impossible during wet weather or on windy days. Thirdly, the solution must be prepared which means time, labor, and the hauling of water. Fourthly, the spraying is effective only for a relatively short period of time. Fifthly, the cost is high. Therefore, experts have turned to a dry granular insecticide, i.e., granular DDT. The granular matter consists of a carrier impregnated with the DDT. This carrier vehicle may be granulated rock, porous granular rock, or rock treated to absorb the insecticide. One good rock for this use is Bentonite Rock. While this granular DDT is without question most valuable for the control of plant pests, its application has posed a real problem.

Therefore, one of the principal objects of my invention is to provide an implement that will successfully apply dry granular insecticide to a field of plants such as corn.

A further object of this invention is to provide a granular matter applicator that will deposit the matter over the rows of plants of a given field.

A still further object is to provide a device that will apply controlled measured amounts of granular material to a field of plants.

A still further object of this invention is to provide a granular material applicator that may be easily adjusted for material release at various vertical positions relative to the ground or plant level.

Still further objects of my invention are to provide a granular material depositing device that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a front view of my device ready for use,

Fig. 2 is an enlarged bottom end view of one of the material exhaust tubes and its spreader plate, Fig. 3 is an enlarged bottom end view of a material exhaust tube with a modified spreader plate, Fig. 4 is an enlarged rear view of one of the material spreading units, Fig. 5 is an enlarged longitudinal sectional view of the feeder means taken on line 5—5 of Fig. 4, and Fig. 6 is a cross sectional view of the feeder means taken on line 6—6 of Fig. 5.

My device may be mounted on any suitable type vehicle, or it may be pulled or pushed by a tractor, or it may be of the self-propelled type. In the drawings I show my device as a self-propelled vehicle. The vehicle per se may be that of or similar to an ordinary corn detasseling machine. Such vehicles have a frame 10, two rear wheels 11 and 12, a front wheel 13. If the machine is motorized, the front wheel is powered and a space for operator and engine is provided on the frame. At each side of the frame is a hinged wing 14 and 15 respectively and each having a downwardly extending column as shown in Fig. 1. The frame 10 also has two downwardly extending columns 16 and 17 and to which the rear wheels are rotatably mounted. These four columns 14, 15, 16 and 17, provide four spaced apart vertical post bearings and this row of columns extends transversely of the direction of travel of the machine. It is to such equipment that my device may be installed and which I will now describe in detail. While my invention may be a one plant row applicator, I show it capable of handling a plurality of rows, six to be exact. The numeral 18 designates a horizontal beam vertically adjustably secured to the columns 14 and 16 by U-bolts 19. The numeral 20 designates a horizontal beam vertically adjustably secured to the columns 17 and 15 by U-bolts 21. A U-bolt held shelf 22 may be placed on each of the columns 16 and 17 to support the beams 18 and 20. To each of these beams 18 and 20 I secure three units. Each unit is horizontally adjustable on its beam by a bolt means 23 selectively extending through a hole of a series of holes 24 in its beam. Inasmuch as each unit is a duplicate of the other, I will only describe one unit with like parts of each unit having the same numerals. The numeral 25 designates a hopper container having its bottom portion tapering downwardly and inwardly. The hopper lid is designated by the numeral 26. The hopper container is secured to its supporting beam by the bolt means 23. Its horizontal adjustment on its supporting bar is by selecting the appropriate bolt hole 24, as shown in Fig. 4. Secured on the lower end of each hopper is a bearing 27 having its top communicating with the inside of the hopper and its bottom open at 28, as shown in Fig. 5. The bore of the bearing 27 is parallel with the beam to which the unit is secured. Rotatably mounted in the bearing is a toothed wheel sleeve 29. The teeth of this sleeve do not extend the complete length of the sleeve but only for a portion of its length as shown in Fig. 6. The inside length of the sleeve is rectangular in cross section. Slidably extending through all of the sleeves 29 of the six units is a shaft 30, rectangular in cross section. The numeral 31 designates a sprocket wheel on the bull wheel 12. The numeral 32 designates a sprocket wheel on the shaft 30. The numeral 33 designates an endless chain embracing the sprocket wheels 31 and 32. Secured to each of the bearings 27 and communicating with its opening 28 is a downwardly extending length of pipe 34. The numeral 35 designates a length of pipe telescopically embracing each pipe length 34 and adjustably held thereon by a set screw or like 36. The numeral 37 designates a spreader plate secured to the lower end portion of each of the pipes 35 and spaced apart from the bottom horizontal plane of such as shown in the drawings. This plate may be flat, may extend outwardly and downwardly at an angle to the horizontal. If desired it may curve downwardly in two or three directions, as shown in Fig. 3. I recommend an inverted spoon structure and if desired material directing radial extending ridges 38 may be imposed thereon as shown in Fig. 3. The toothed feeding wheel sleeves 29 may be rigidly adjustably secured to the shaft 30 by any suitable means such as a set screw 39. The material to be distributed is designated by the numeral 40.

The practical operation of the device is as follows:

With the hoppers filled with the material to be distributed, the device is propelled over the field. Usually in the case an insecticide is to be dropped, the hopper containers 25 are laterally adjusted on their supporting beams so that the material will fall directly on top of the row of plants to be treated. With the wheels rolling over the ground surface the shaft 30 will be rotated which in turn will rotate the feeding toothed wheel sleeves 29. Material 40 will be engaged by the teeth and carried from the hopper to the opening 28, where it will drop by gravity downwardly through the pipes 34 and 35. Therefore, the members 29 will not only act as material feeding retarding means but will provide measured amounts of material into the distribution pipes. This measured amount may be regulated by releasing the set screws 39 and sliding the sleeves on the shaft 30 accordingly. The more of the smooth part of the sleeve that is adjacent the opening 28, the less amount of material will be fed. Another method of regulation would be the changing of the size of one of the sprockets 31 or 32. With the pipes 35 over the rows of plants, respectively, the granular material will fall downwardly, strike the plates 37, and be scattered over the plants. The scatter area may be controlled in several ways. The shape and/or angle of the plates will be a determining factor. Also the striking force of the material on the plates will control the spread. This striking force is adjustable by regulating the distance of drop from the feeding sleeves to the scatter plates. This is done by contracting or expanding the telescoping pipes 34 and 35. To compensate for crops of different height, the beams 18 and 20 are vertically adjusted on the columns 14, 16, 17 and 15, as shown by broken lines in Fig. 1. The material dropped will fall onto the plant, be guided into the plant whorl where it will be retained and preserved. The material will mix with the plant moisture at its whorl and be available to destroy the insect or plant pest. The treatment will be most effective and such heavy granular matter may be applied during wind conditions or wet weather.

While I have described the device for applying granular DDT, any other suitable dry insecticide may be used. My device can also be used to apply fertilizer at any horizontal plane relative to the ground or plant surface. By using two separate beams, 18 and 20, the wings 14 and 15 may be folded for transportation to or from the field or for passing through gates or like.

The amount of material being dispensed may be regulated by adjusting the members 29 on the rod 30, or if desired the rod 30 may be horizontally adjusted back and forth to give the desired amount of material to be spread over a given area.

Some changes may be made in the construction and arrangement of my granular material applicator without departing from the real spirit and purpose of my invention, and it is my intention to cover by my claims, any modified forms of structure or use of mechanical equivalents which may be reasonably included within their scope.

I claim:

1. In a granular material applicator, a wheel supported frame means having two pairs of spaced apart downwardly extending posts, a horizontal beam, means for vertically adjustably securing said beam to one pair of posts, a second horizontal beam, means for vertically adjustably securing said second beam to the other pair of posts, two hopper containers, means for individually horizontally adjustably securing said two containers to said first beam, two hopper containers, means for individually horizontally adjustably securing said last mentioned two containers to said second beam, a bearing on each of said containers and having an opening communicating with the inside of the container of which it is a part and an outlet opening, a vertically downwardly extending pipe means on each of said bearings and communicating with its said outlet opening, a rotatable member in each of said bearings and having cavities for operatively passing material to said outlet opening, a shaft operatively connected to each of said rotatable members, a scatter plate secured to and spaced from the lower end of each of said vertical pipes, and a means for rotating said shaft; each of said rotatable members being slidably adjustable in its bearing along said shaft to regulate the discharge of material from each of said containers.

2. In a granular material applicator, a wheel supported frame means having two pairs of spaced apart downwardly extending posts, a horizontal beam, means for vertically adjustably securing said beam to one pair of posts, a second horizontal beam, means for vertically adjustably securing said second beam to the other pair of posts, two hopper containers, means for individually horizontally adjustably securing said two containers to said first beam, two hopper containers, means for individually horizontally adjustably securing said last mentioned two containers to said second beam, a bearing on each of said containers and having an opening communicating with the inside of the container of which it is a part and an outlet opening, a vertical downwardly extending pipe means on each of said bearings and communicating with its said outlet opening, a rotatable member in each of said bearings and having cavities for operatively passing material to said outlet opening, a shaft operatively connected to each of said rotatable members, a scatter plate having ridges on the upper surface thereof secured to and spaced from the lower end of each of said vertical pipes, and a means for rotating said shaft; each of said rotatable members being slidably adjustable in its bearing along said shaft to regulate the discharge of material from each of said containers.

References Cited in the file of this patent

UNITED STATES PATENTS

| | | |
|---|---|---|
| 134,293 | Kneisly | Dec. 24, 1872 |
| 243,727 | Ruggles | July 5, 1881 |
| 323,328 | Hart | July 28, 1885 |
| 534,750 | Kimball | Feb. 26, 1895 |
| 978,363 | Frantz et al. | Dec. 13, 1910 |
| 1,571,082 | Zimlich | Jan. 26, 1926 |
| 1,751,346 | Mazak | Mar. 18, 1930 |
| 1,988,618 | Blaschke | Jan. 22, 1935 |
| 2,626,579 | Shaw | Jan. 27, 1953 |